M. R. SIMS.
CULTIVATOR ATTACHMENT.
APPLICATION FILED MAY 1, 1920.
1,421,593.
Patented July 4, 1922.
2 SHEETS—SHEET 1.
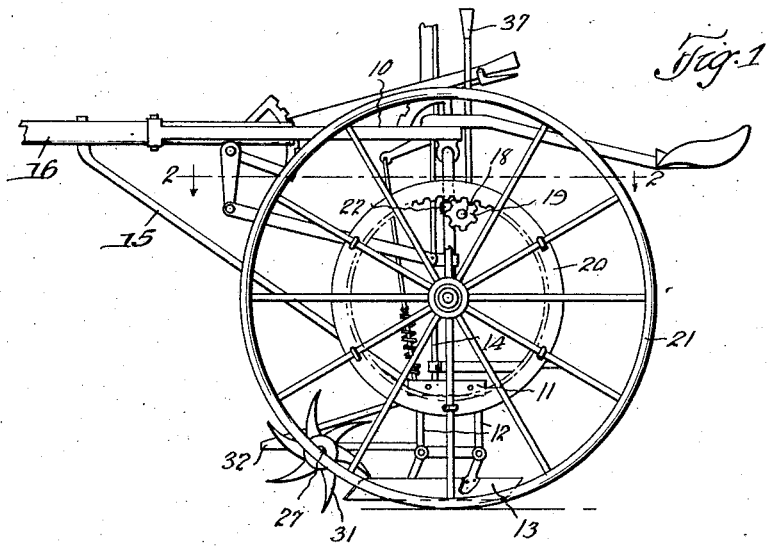
Fig. 1
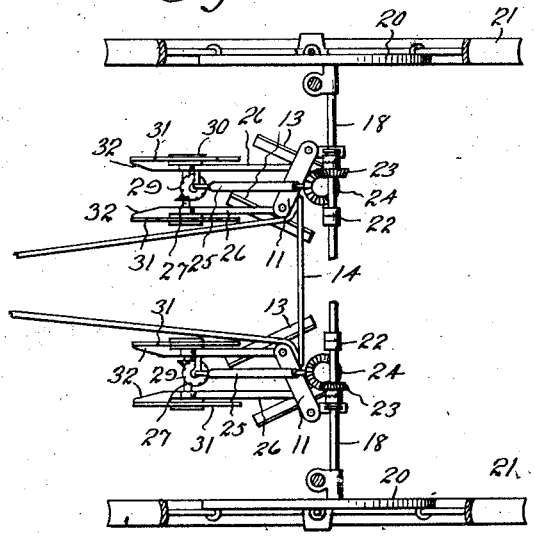
Fig. 2
Inventor
Milford R. Sims
Attorney

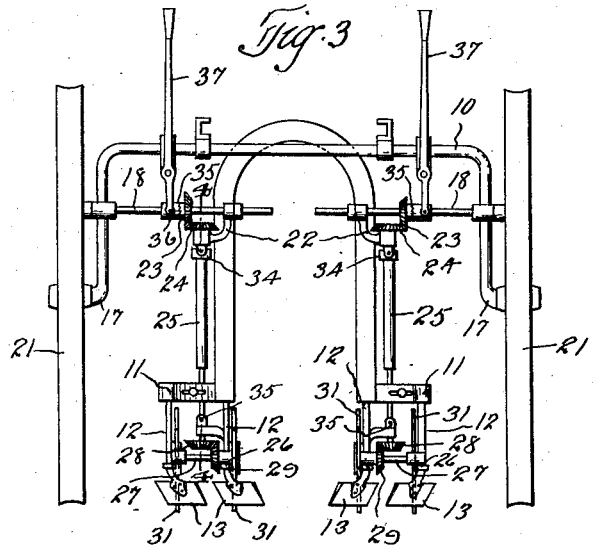
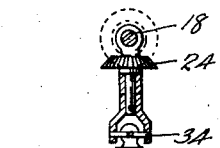
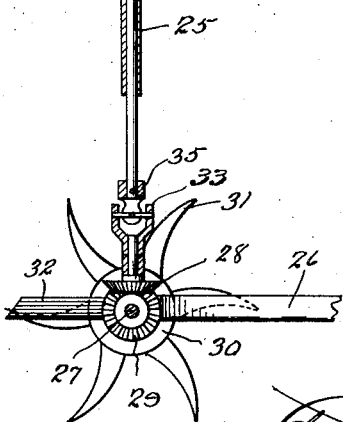

UNITED STATES PATENT OFFICE.

MILFORD R. SIMS, OF SAUNEMIN, ILLINOIS.

CULTIVATOR ATTACHMENT.

1,421,593. Specification of Letters Patent. Patented July 4, 1922.

Application filed May 1, 1920. Serial No. 378,140.

*To all whom it may concern:*

Be it known that I, MILFORD R. SIMS, a citizen of the United States, residing at Saunemin, in the county of Livingston, State of Illinois, have invented certain new and useful Improvements in Cultivator Attachments; and I do hereby declare the following to be a full, clear, and exact description of the invention, such as will enable others skilled in the art to which it appertains to make and use the same.

In the surface cultivation of standing plants farmers generally use elongated blades which are set at an angle and only dig sufficiently deep to turn over the top of the soil to cover the roots of the young plants. In performing this surface cultivation morning-glory vines, and other weeds and plants, which tend to choke the young plants, become so entangled in the blades of the cultivator that it is necessary for the farmer to get down from the machine, at short intervals, to remove the weeds and vines. This entails loss of time, and requires considerable labor to the farmer. In desperation, some farmers resort to the use of the shovel cultivator, but these shovels dig so deeply into the soil near the young plants, that they cut the roots and thus injure or completely destroy a large number of the plants.

It is the special object of the present invention to provide a novel and improved device by means of which the vines and weeds will be effectively removed from around the plants, and without danger to the plants.

A further object is to provide a novel and improved device of this character which is adapted to be used in connection with the ordinary surface cultivator and by means of which the entanglement of the vines and weeds, with the blades, is prevented.

In the drawing:

Figure 1 is a side elevation of a portion of a cultivator showing the improvement applied thereto.

Figure 2 is a sectional view of the same, on the line 2—2 of Figure 1.

Figure 3 is a rear elevation of the same.

Figure 4 is a longitudinal detail central sectional view taken through one of the telescoping shafts, on the line 4—4 of Figure 3.

Referring particularly to the accompanying drawings, 10 represents a portion of the frame of a cultivator to which are attached the beams 11, having the depending posts 12 carrying the adjustable surface cultivating blades 13. An arch 14 connects the beams in spaced relation to each other, while draw bars 15 are connected to the beams and the draft pole 16 of the cultivator. All of the parts above mentioned are such as are generally in use, and in connection with which the present invention is especially adapted for use.

Mounted on the frame of the cultivator, above the axle 17, is a transverse shaft 18, having on its ends the pinions 19 which mesh with larger pinions 20, carried by the ground wheels 21 of the cultivator, and which wheels are mounted on the ends of the axle. Said shaft 18 is supported on the frame by means of the brackets 22, as shown. Secured on the shaft 18, intermediate the length thereof, are the spaced pinions 23, which mesh with similar pinions 24 carried by the upper ends of the downwardly and rearwardly extending shafts 25. The shafts 25, as shown, are formed in sections which are arranged in telescoping relation, so that they can be lengthened and shortened, as desired, and for a purpose which will presently appear hereinafter.

Carried by the beams, and extending forwardly therefrom, are the bearing brackets 26 in which are mounted the transverse shafts 27. On the intermediate portion of each shaft 27 there is secured a pinion 28 which meshes with a similar pinion 29 carried by the lower end of a shaft 25, and by which the shaft 27 is driven. Mounted on each end of each of the shafts 27 is a hub 30 to which is secured a circular series of radiating and curved cutting blades, 31, said blades cooperating with the stationary blades, 32, secured to certain of the brackets 26. It will be noted that the blades 31 are curved longitudinally, and that the wheels carrying said blades rotate in a direction opposite to that in which the cultivator is traveling, with the result that the blades, which act as hooks, dig down into the soil and lift the vines and weeds up to the stationary blades 32, cutting them completely in two. The vines and weeds will thus be pulled up by the roots and severed so that they will die, and the standing plants protected against being choked thereby.

The shafts 25 are provided with the universal joints 33 and 34, adjacent their upper and lower ends, respectively, so that as the driver of the cultivator moves the cultivating blades to one side to avoid engagement with a plant which is out of line with the plants of the rest of the row, the cutting blades 31 will be moved also, so that the plant will not be injured thereby.

The pinions 19 are splined on the shaft 18, and have clutch faces 35 for engagement with clutch faces 36 on the larger pinions 20, said pinions 19 being suitably connected to shifting levers 37 whereby the cutting mechanism can be thrown into and out of gear as desired. This is especially useful when the cultivator blades are elevated when the machine is drawn from one field to another, or when being moved and the cutting blades are not in use.

There is thus provided a novel and improved vine and weed destroyer which is adapted for use in connection with a shallow or surface cultivator, and which will effectively prevent the usual tangling of such weeds and vines with the blades of the cultivator.

What is claimed is:

1. A weed destroying attachment for a surface cultivator including earth working elements for lifting weeds, stationary cutting elements adjacent the earth working elements, and rotary cutting elements cooperating with the stationary cutting elements and mounted to initially lift the weeds from the earth working elements to the stationary cutting elements to sever the same.

2. A weed destroying attachment for a cultivator including earth working elements for lifting weeds from the ground, stationary cutter blades mounted above and extending forwardly of the earth working elements, and rotary cutters having radial and curved cutting blades cooperating with the stationary blades and traveling in a direction to lift the weeds to the stationary blades.

In testimony whereof, I affix my signature, in the presence of two witnesses.

MILFORD R. SIMS.

Witnesses:
BEULAH G. L. SIMS,
RUSSEL C. PEMBERTON.